US012055071B2

(12) United States Patent
Kim et al.

(10) Patent No.: US 12,055,071 B2
(45) Date of Patent: Aug. 6, 2024

(54) CMC VANE WITH FLANGE HAVING SLOPED RADIAL FACE

(71) Applicant: RAYTHEON TECHNOLOGIES CORPORATION, Farmington, CT (US)

(72) Inventors: Russell Kim, Temecula, CA (US); Howard J. Liles, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/319,597

(22) Filed: May 18, 2023

(65) Prior Publication Data

US 2024/0068374 A1 Feb. 29, 2024

Related U.S. Application Data

(60) Provisional application No. 63/346,447, filed on May 27, 2022.

(51) Int. Cl.
*F01D 9/00* (2006.01)
*F01D 5/28* (2006.01)
*F01D 9/04* (2006.01)

(52) U.S. Cl.
CPC ............. *F01D 9/042* (2013.01); *F01D 5/282* (2013.01); *F01D 5/284* (2013.01); *F05D 2240/12* (2013.01); *F05D 2300/6033* (2013.01)

(58) Field of Classification Search
CPC . F01D 5/04; F01D 5/041; F01D 5/042; F01D 5/284; F01D 25/005; F01D 9/04; F01D 9/041; F01D 9/042; F05D 2300/6033; F05D 2240/12
See application file for complete search history.

(56) References Cited

U.S. PATENT DOCUMENTS 10,072,516 B2 9/2018 Carr et al.
10,309,240 B2 * 6/2019 Heitman ................. F01D 9/042
10,370,986 B2 * 8/2019 Heitman ................. F01D 9/042
10,975,706 B2 4/2021 Farrar et al.

* cited by examiner

*Primary Examiner* — David E Sosnowski
*Assistant Examiner* — Maxime M Adjagbe
(74) *Attorney, Agent, or Firm* — Carlson, Gaskey & Olds, P.C.

(57) ABSTRACT

A vane arc segment includes a ceramic matrix composite fairing that has first and second platforms and an airfoil section that extends in a radial direction there between. Each of the first and second platforms includes axially-facing leading and trailing sides, a core gaspath side, and a non-core gaspath side. The non-core gaspath side of the first platform has a flange that projects radially there from and extends adjacent the trailing side. The flange has a radial face that is sloped with respect to the radial direction.

11 Claims, 4 Drawing Sheets

CMC VANE WITH FLANGE HAVING SLOPED RADIAL FACE

CROSS-REFERENCE TO RELATED APPLICATION

The present disclosure claims priority to U.S. Provisional Application No. 63/346,447 filed May 27, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane arc segment according to an example of the present disclosure includes a ceramic matrix composite (CMC) fairing that has first and second platforms and an airfoil section that extends in a radial direction there between. Each of the first and second platforms includes axially-facing leading and trailing sides, a core gaspath side, and a non-core gaspath side. The non-core gaspath side of the first platform has a flange that projects radially there from and extends adjacent the trailing side. The flange has a radial face that is sloped with respect to the radial direction.

In a further embodiment of any of the foregoing embodiments, the radial face is a frustoconic arc segment.

In a further embodiment of any of the foregoing embodiments, the radial face defines a reference surface that, when infinitely extended, is non-intersecting with the airfoil section In a further embodiment of any of the foregoing embodiments, the flange is elongated in a circumferential direction.

In a further embodiment of any of the foregoing embodiments, the flange is a lone flange on the non-core gaspath side of the first platform.

In a further embodiment of any of the foregoing embodiments, the radial face is sloped at an angle of 30 degrees to 60 degrees relative to the radial direction.

In a further embodiment of any of the foregoing embodiments, the CMC fairing is comprised of fiber plies disposed in a ceramic matrix, and one of the fiber plies in the first platform is turned up to form at least a portion of the flange.

In a further embodiment of any of the foregoing embodiments, the flange includes a radial stack of the fiber plies adjacent to the one of the fiber plies that is turned up.

In a further embodiment of any of the foregoing embodiments, the one of the fiber plies that is turned up has a terminal end face that forms a portion of the radial face.

In a further embodiment of any of the foregoing embodiments, the CMC fairing is comprised of fiber plies disposed in a ceramic matrix, and multiple ones of the fiber plies in the first platform are turned up to form the flange.

In a further embodiment of any of the foregoing embodiments, each of the fiber plies that are turned up has a terminal end face that forms a portion of the radial face.

A gas turbine engine according to an example of the present disclosure includes a vane arc segment including a ceramic matrix composite (CMC) fairing that has first and second platforms and an airfoil section that extends in a radial direction there between. Each of the first and second platforms includes axially-facing leading and trailing sides, a core gaspath side, and a non-core gaspath side. The non-core gaspath side of the first platform has a flange that projects radially there from and extends adjacent the trailing side. The flange has a radial face that is sloped with respect to the radial direction. First and second supports radially between which the vane arc segment is held, the first support supporting the vane arc segment at the radial face, and the second support supporting the vane arc segment via the second platform.

In a further embodiment of any of the foregoing embodiments, the radial face is a frustoconic arc segment.

In a further embodiment of any of the foregoing embodiments, the radial face defines a reference surface that, when infinitely extended, is non-intersecting with the airfoil section In a further embodiment of any of the foregoing embodiments, the flange is elongated in a circumferential direction, and the flange is a lone flange on the non-core gaspath side of the first platform.

In a further embodiment of any of the foregoing embodiments, the CMC fairing is comprised of fiber plies disposed in a ceramic matrix, and one of the fiber plies in the first platform is turned up to form at least a portion of the flange.

In a further embodiment of any of the foregoing embodiments, the flange includes a radial stack of the fiber plies adjacent to the one of the fiber plies that is turned up.

In a further embodiment of any of the foregoing embodiments, the one of the fiber plies that is turned up has a terminal end face that forms a portion of the radial face.

In a further embodiment of any of the foregoing embodiments, the CMC fairing is comprised of fiber plies disposed in a ceramic matrix, and multiple ones of the fiber plies in the first platform are turned up to form the flange.

In a further embodiment of any of the foregoing embodiments, each of the fiber plies that are turned up has a terminal end face that forms a portion of the radial face.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
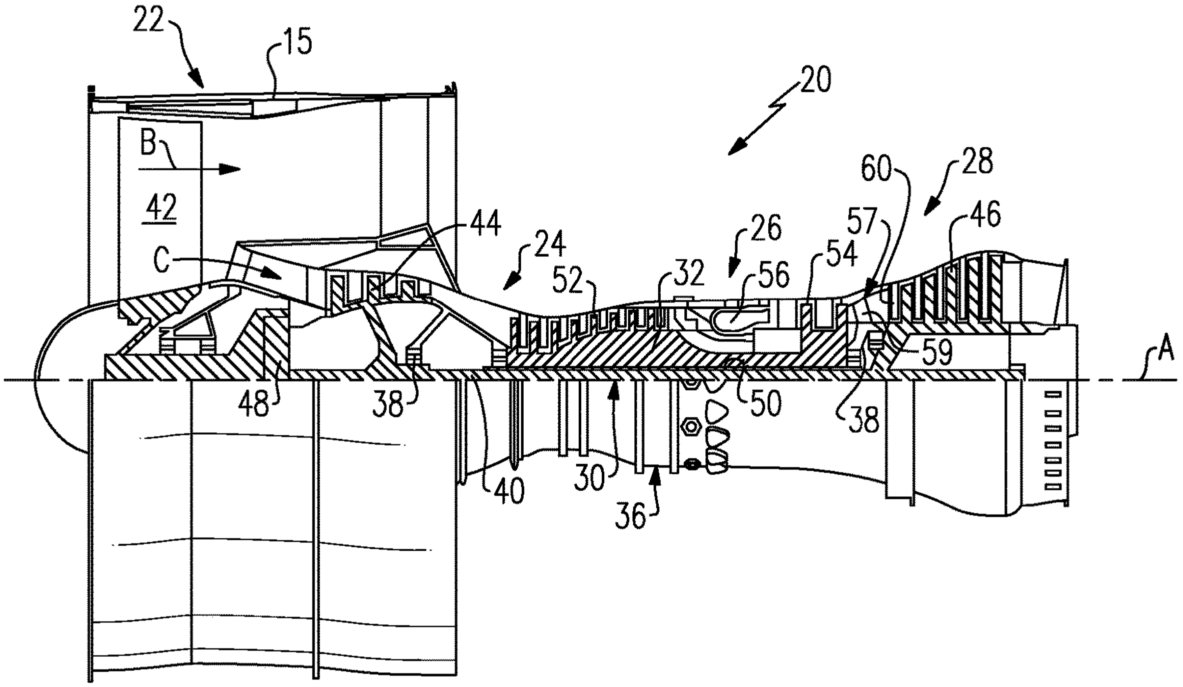
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram}\ ^\circ \text{R})/(518.7^\circ \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
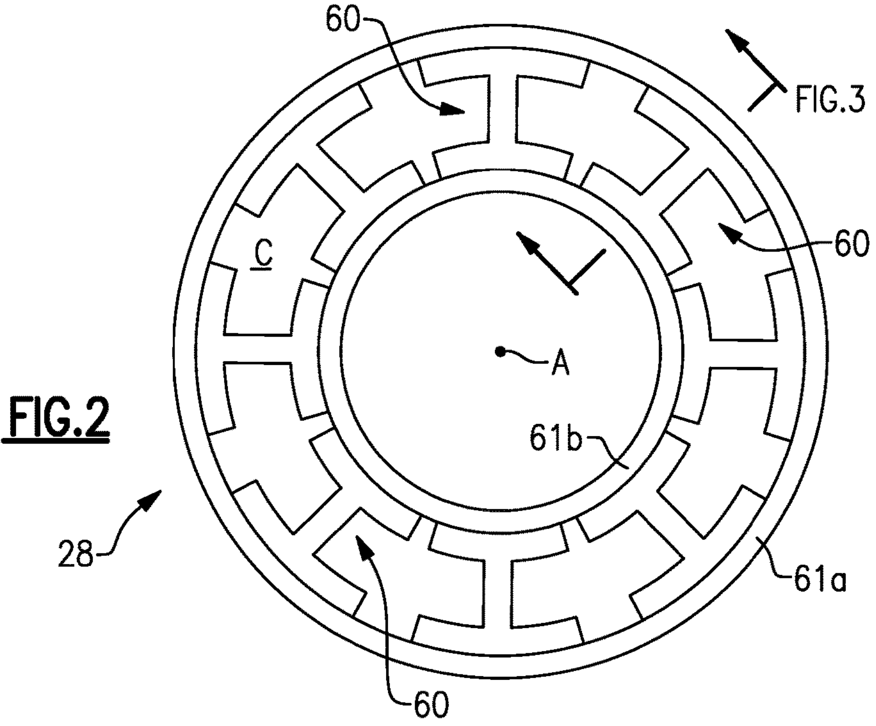
FIG. 2 illustrates a portion of the turbine section of the engine.

FIG. 2 illustrates an axial view of an example of a portion of the turbine section 28 of the engine 20. The turbine section 28 includes vane arc segments 60 radially disposed in an annulus defined between first (outer) and second (inner) supports 61*a*/61*b* that support the vane arc segments 60. The supports 61*a*/61*b* are shown schematically, but each one may be a continuous full hoop ring, an engine case, one or more intermediate structures that attach to an engine case, a series of spars, or other static structure or structures in the engine 20.

Figure 3:
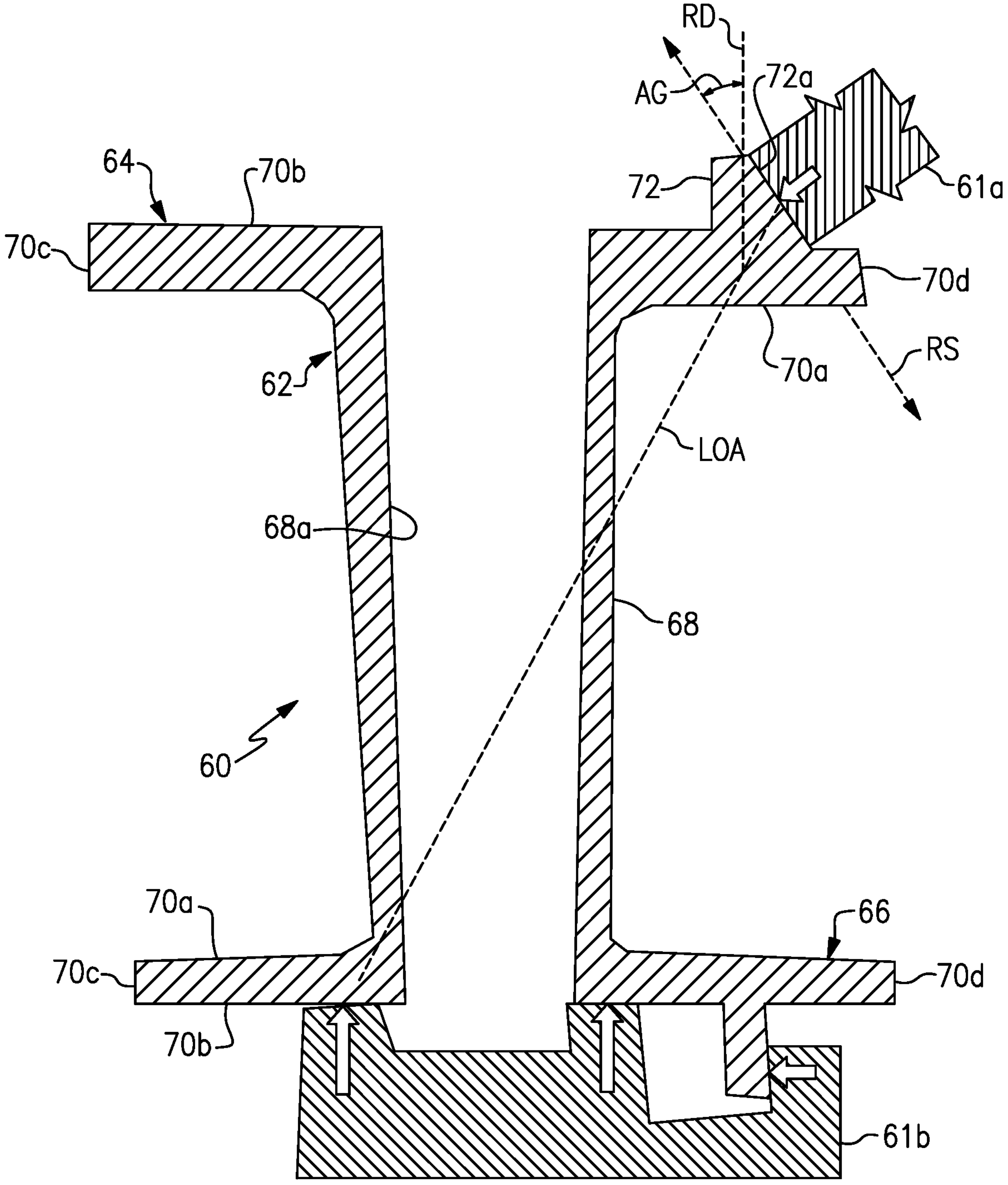
FIG. 3 illustrates a CMC fairing of the turbine section.

FIG. 3 illustrates a representative sectioned view through one of the vane arc segments 60 (only a portion of the first support 61*a* is shown). Each vane arc segment 60 is comprised of a ceramic matrix composite (CMC) fairing 62. The CMC fairing 62 has several sections, including first (outer) and second (inner) platforms 64/66 and an airfoil section 68 that extends between the platforms 64/66. The airfoil section 68 has that has an internal through-cavity 68*a* for conveying cooling air, such as bleed air from the compressor section 24. The platforms 64/66 provide radially outer and inner bounds of the core gas path C. Each of the platforms 64/66 defines a first radial side 70*a* (core gas path side), an opposed second radial side 70*b* (non-core gas path side), an axially forward-facing leading side 70*c*, and an axially aft-facing trailing side 70*d*, as well as circumferential sides (not shown).

The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The CMC material from which the fairings 62 are made is comprised of a ceramic reinforcement, which is usually ceramic fibers, in a ceramic matrix. Example ceramic matrices of the CMC are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The ceramic matrix composite may be, but is not limited to, a SiC/SiC ceramic matrix composite in which SiC fiber plies are disposed within a SiC matrix. The fiber plies have a fiber architecture, which refers to an ordered arrangement of the fiber tows relative to one another, such as a 2D woven ply or a 3D structure. The CMC fairings 62 may be one-piece structures in which at least a portion of the fiber plies are continuous from the first platform 64, through the airfoil section 68, and into the second platform 66.

Structural vane arc segments require axial, radial, and circumferential constraints to inhibit motion when loaded by gas path and/or secondary flow forces. Attachment of CMC fairings in an engine, however, is challenging. Attachment features, such as hooks, that are typically used for metal alloy vanes can result in inefficient loading if employed in CMCs, which may be sensitive to stress directionality and distress conditions that differ from those of metal alloy components. Additionally, features such as feather seal slots, variable thickness walls, buttresses, gussets, weldments, complex-geometry investment casting cores, bare machined surfaces, etc. that may be used in metal alloy components are generally not acceptable or attainable with CMC materials.

Figure 4:
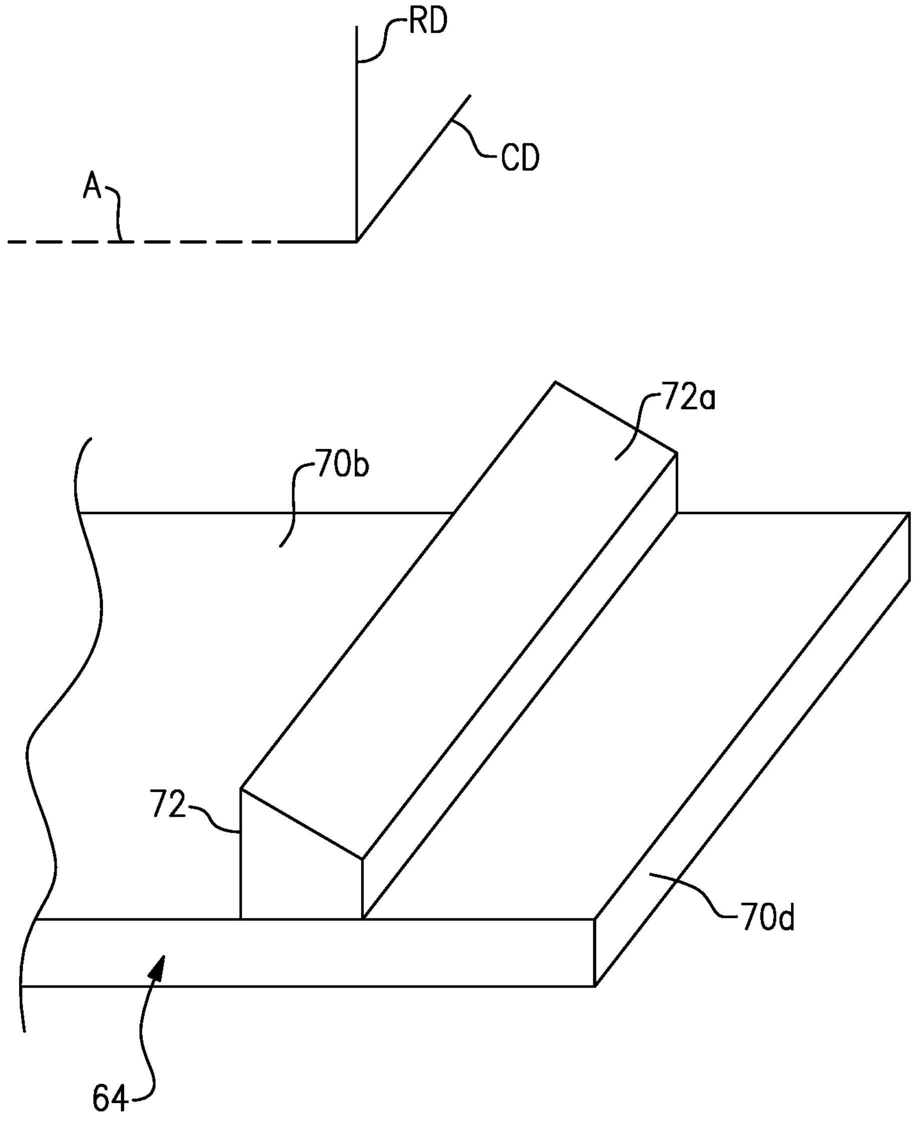
FIG. 4 illustrates a flange of the CMC fairing.

To facilitate addressing the considerations above the first platform 64 of the includes a flange 72 that projects radially from the non-core gaspath side 70*b*. In this example, the flange 72 is a lone, exclusive flange of the first platform 64 in that it is the only radial projection of the platform 64 on non-core gaspath side 70*b*. As shown, the flange 72 is a radially upstanding wall that is located adjacent the axially-facing trailing side 70*d*. As shown in FIG. 4, the flange 72 is generally elongated in the circumferential direction CD. For instance, the flange 72 fully spans or substantially fully spans the circumferential sides of the platform 64.

The flange 72 has a radial face 72*a* that is sloped with respect to the radial direction RD. The radial face 72*a* arcs about the axis A, but in cross-section taken along a radial plane can be flat, concave toward the axis A, or convex away from the axis A. For example, the radial face 72*a* is sloped at an angle AG of 30 degrees to 60 degrees relative to the radial direction. If the radial face 72*a* is concave or convex, the angle AG is taken relative to a reference line that intersects the forward-most and aft-most points of the radial face 72*a*. In a further example, the angle AG is 40 degrees to 50 degrees.

The CMC fairing 62 is supported via the flange 72 and, in particular, via interface with the radial face 72*a*. The slope of the radial face 72*a* focuses load transmission along a line of action *LOA* that extends across the airfoil section 68 to the forward portion of the platform 66. In terms of the orientation of the radial face 72*a*, this means that the radial face 72*a* faces in aft radially outwardly direction such that it defines a reference surface RS that, when infinitely extended, is non-intersecting with the airfoil section 68.

The locations at which the loads are primarily borne are indicated in FIG. 3 with block arrows. The slope of the radial face 72*a* produces the line of action *LOA*, which in turn causes the airfoil fairing 62 to be loaded in compression. As CMC material is relatively strong in compression, as compared to loading in tension, this loading scheme provided by the radial face 72*a* produces a favorable stress state for the CMC fairing 62.

In a further example, to facilitate load distribution, the radial face 72*a* has the geometry of a frustoconic arc segment. A conic frustum is a truncated cone and the outer surface of the frustum is frustoconical. If the conic frustum is sectioned off along a plane that is non-intersecting with the central axis of the frustum, the shape of the frustoconical surface sectioned off is a frustoconic arc segment, which could also be referred to as a frustic surface.

As mentioned above, the CMC fairing 62 is made of fiber plies disposed in a ceramic matrix. FIGS. 5A, 5B, 5C, and 5D show example ply configurations of the fiber plies 74 in the platform 64 and flange 72, although the CMC fairing 62 is not limited to these. In each of the examples, the radial face 72*a* may be formed after formation of the flange 72 by machining the flange 72. Alternatively, the radial face 72*a* may be formed in full or in part during a ply lay-up process by cutting prepreg fiber plies.

Figure 5A:
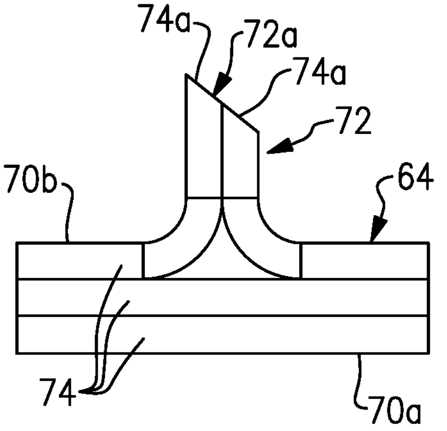
FIG. 5A illustrates an example fiber ply configuration of the flange.

FIG. 5A depicts a double-J configuration in which two fiber plies 74 are turned-up back-to-back to form the flange 72. Each of the turned-up fiber plies has a terminal end face 74*a* that forms a portion of the radial face 72*a*. In this configuration, the loads in the flange 72 are primarily borne along the in-plane direction of the turned-up fiber plies 74, i.e., the fiber plies are compressed along their length.

Figure 5C:
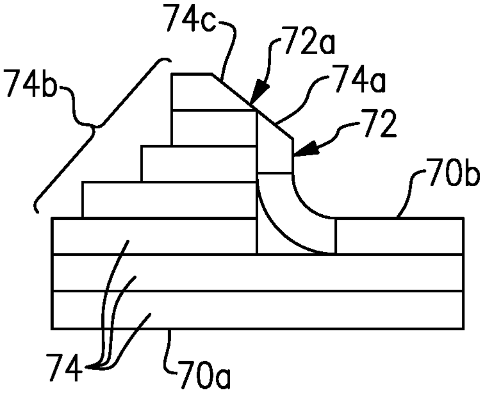
FIG. 5C illustrates another example fiber ply configuration of the flange.
Figure 5B:
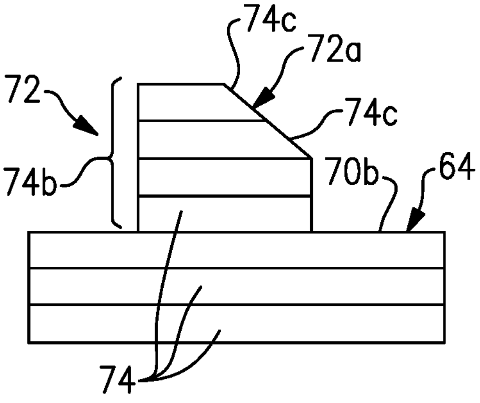
FIG. 5B illustrates another example fiber ply configuration of the flange.

FIG. 5B depicts a stacked configuration in which a stack 74*b* of fiber plies 74 forms the flange 72. One or more of the fiber plies 74 in the stack 74*b* has a terminal end face 74*c* that forms a portion of the radial face 72*a*. In this configuration, the loads in the flange 72 are primarily borne along the out-of-plane direction of the stacked fiber plies 74, i.e., the stack 74*b* is compressed, although there may also be some shear along the fiber ply interfaces.

FIG. 5C depicts a single-J stacked configuration in which one of the fiber plies 74 is upturned and backs against a stack 74*b* of the fiber plies 74. The terminal end face 74*a* of the upturned fiber ply 74 forms a portion of the radial face 72*a*, and the terminal end face 74*c* of one of the stacked fiber plies 74 forms another portion of the radial face 72*a*. In this configuration, the loads in the flange 72 are primarily borne along the in-plane direction in the upturned fiber ply 74 and the out-of-plane direction of the stacked fiber plies 74, i.e., the upturned fiber ply 74 is compressed along its length and the stack 74_b_ is compressed, although there may also be some shear along the fiber ply interfaces.

Figure 5D:
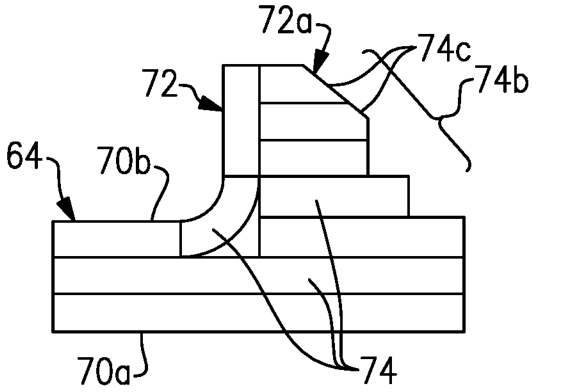
FIG. 5D illustrates another example fiber ply configuration of the flange.

FIG. 5D is a reverse single-J stacked configuration. It is the same as the configuration in FIG. 5C except that the position of the stack 74_b_ and the upturned fiber ply 74 are swapped. In this case, it is only the terminal end faces 74_c_ of the fiber plies 74 of the stack 74_b_ that form the radial face 72_a_. However, depending on the angle of the radial face 72_a_ and thickness of the fiber plies 74 it is also possible that the radial face 72_a_ intersects the upturned fiber ply 74 such that its terminal end face 74_a_ forms a portion of the radial face 72_a_.

As discussed above, the radial face 72_a_ facilitates a favorable loading scheme for the CMC fairing 62. Furthermore, the flange 72 is readily manufacturable via ply lay-up and machining, if used, is minimal. Additionally, the use of the flange 72 permits the walls of the platform 64 to be entirely substantially uniform in thickness. For instance, if a sloped face were to be formed directly into the platform, the platform would need to be made thicker to provide volume to machine away to form the sloped face. As a result, the platform would be substantially thicker in some areas than others, which could exacerbate thermal gradients and may be difficult to manufacture with a uniform matrix density.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane arc segment comprising:

a ceramic matrix composite (CMC) fairing having first and second platforms and an airfoil section extending in a radial direction there between, each of the first and second platforms including axially-facing leading and trailing sides, a core gaspath side, and a non-core gaspath side, the non-core gaspath side of the first platform having a flange projecting radially there from and extending adjacent the trailing side, the flange having a radial face that is sloped with respect to the radial direction, the CMC fairing comprised of fiber plies disposed in a ceramic matrix, and at least two of the fiber plies in the first platform are turned up back-to-back to form the flange, and each of the at least two fiber plies has a terminal end face that forms at least a portion of the radial face.

2. The vane arc segment as recited in claim 1, wherein the radial face is a frustoconic arc segment.

3. The vane arc segment as recited in claim 2, wherein the radial face defines a reference surface that, when infinitely extended, is non-intersecting with the airfoil section.

4. The vane arc segment as recited in claim 1, wherein the flange is elongated in a circumferential direction.

5. The vane arc segment as recited in claim 1, wherein the flange is a lone flange on the non-core gaspath side of the first platform.

6. The vane arc segment as recited in claim 1, wherein the radial face is sloped at an angle of 30 degrees to 60 degrees relative to the radial direction.

7. A gas turbine engine comprising:

a vane arc segment including a ceramic matrix composite (CMC) fairing having first and second platforms and an airfoil section extending in a radial direction there between, each of the first and second platforms including axially-facing leading and trailing sides, a core gaspath side, and a non-core gaspath side, the non-core gaspath side of the first platform having a flange projecting radially there from and extending adjacent the trailing side, the flange having a radial face that is sloped with respect to the radial direction; and first and second supports radially between which the vane arc segment is held, the first support supporting the vane arc segment at the radial face, and the second support supporting the vane arc segment via the second platform, the CMC fairing comprised of fiber plies disposed in a ceramic matrix, and at least one of the fiber plies in the first platform is turned up to form a portion of the flange and a plurality of other fiber plies are in a radial stack against the at least one fiber ply that is turned up to form another portion of the flange, the at least one fiber ply that is turned up and the plurality of other fiber plies each having a terminal end that forms a portion of the radial face.

8. The gas turbine engine as recited in claim 7, wherein the radial face is a frustoconic arc segment.

9. The gas turbine engine as recited in claim 8, wherein the radial face defines a reference surface that, when infinitely extended, is non-intersecting with the airfoil section.

10. The gas turbine engine as recited in claim 9, wherein the flange is elongated in a circumferential direction, and the flange is a lone flange on the non-core gaspath side of the first platform.

11. A vane arc segment comprising:

a ceramic matrix composite (CMC) fairing having first and second platforms and an airfoil section extending in a radial direction there between, each of the first and second platforms including axially-facing leading and trailing sides, a core gaspath side, and a non-core gaspath side, the non-core gaspath side of the first platform having a flange projecting radially there from and extending adjacent the trailing side, the flange having a radial face that is sloped with respect to the radial direction, the CMC fairing comprised of fiber plies disposed in a ceramic matrix, and at least one of the fiber plies in the first platform is turned up to form a portion of the flange and a plurality of other fiber plies are in a radial stack against the at least one fiber ply that is turned up to form another portion of the flange, the plurality of other fiber plies each have a terminal end that forms a portion of the radial face.

* * * * *